Figure 1D:
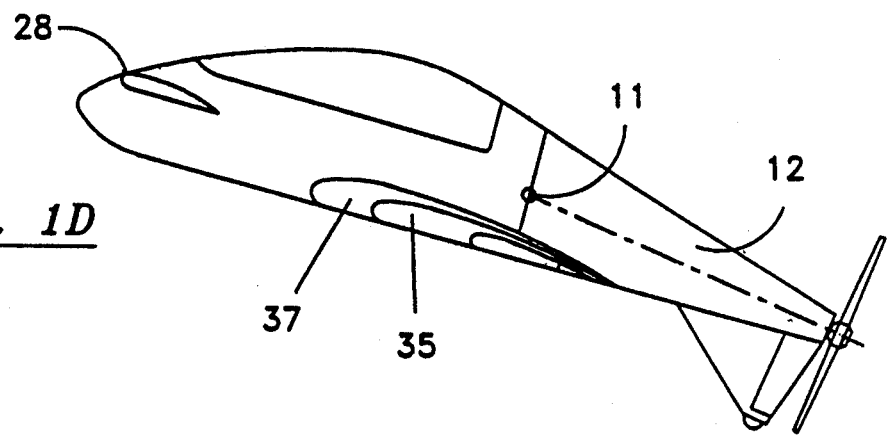

United States Patent [19]
Wooley

[11] Patent Number: 5,201,478
[45] Date of Patent: Apr. 13, 1993

[54] AIRPLANE EFFICIENCY, SAFETY AND UTILIZATION

[76] Inventor: Don H. Wooley, 252 Las Miradas Dr., Los Gatos, Calif. 95030

[21] Appl. No.: 725,217

[22] Filed: Jun. 26, 1991

Related U.S. Application Data

[63] Continuation-in-part of Ser. No. 505,413, Apr. 6, 1990, abandoned.

[51] Int. Cl.⁵ .......................... B64C 37/00; B64C 1/30
[52] U.S. Cl. .......................................... 244/2; 244/49; 244/89; 244/120
[58] Field of Search ................ 244/2, 49, 120, 51, 244/52, 89, 50, 102 R

[56] References Cited

U.S. PATENT DOCUMENTS

| | | | |
|---|---|---|---|
| 1,828,026 | 10/1931 | Cline et al. | 244/120 |
| 2,271,226 | 1/1942 | Johnson | 244/45 A |
| 2,434,068 | 6/1948 | Geisse | 244/2 |
| 2,478,847 | 8/1949 | Stuart | 244/51 |
| 2,624,530 | 3/1953 | Hanssen | 244/2 |
| 2,767,939 | 11/1956 | Taylor | 244/2 |
| 3,054,579 | 9/1962 | Bary | 244/51 |
| 3,222,012 | 12/1965 | Piasecki | 244/51 |
| 3,281,096 | 10/1966 | Konecheck | 244/51 |
| 3,966,142 | 6/1976 | Corbett et al. | 244/120 |
| 4,358,072 | 11/1982 | Williamson | 244/2 |
| 4,598,888 | 7/1986 | Beteille | 244/45 A |
| 4,627,585 | 12/1986 | Einstein | 244/49 |
| 4,746,081 | 5/1988 | Mazzoni | 244/45 A |
| 4,881,701 | 11/1989 | Bullard | 244/49 |

*Primary Examiner*—Galen Barefoot

[57] ABSTRACT

This invention involves a simple but radical approach to airplane design. Many advantages and benefits result therefrom including improved flight efficiency, better handling and control response, less tail area required, increased safety, increased utility of airplanes, and reduced ground handling and hangar facility requirements. A solution is provided for the inherent problems of combining the utility of a surface conveyance with the freedom and swiftness of flight.

20 Claims, 6 Drawing Sheets

AIRPLANE EFFICIENCY, SAFETY AND UTILIZATION

This is a continuation-in-part Application of Application Ser. No. 07/505,413 filed Apr. 6, 1990, now abandoned.

BACKGROUND—FIELD OF INVENTION

This invention involves a simple but radical approach to airplane design. Many benefits and advantages derive therefrom. More effective flight control, greater flight efficiency, improved safety and greater utilization of aircraft result from this invention. The concept was originally conceived to provide a solution to the inherent problems of combining the utility of an automobile with the freedom and swiftness of flight. However, the advantages of the concept can be applied to airplanes from commercial airliners down to the smallest personal airplane. Although the concept is simple involving few parts its impact is incalculable as to airplane safety, airplane use by the general public and its effect on the efficiency of commercial aircraft and thus its effect upon our national resources.

Also, integral with and dependent upon the basic invention are a number of special features and benefits that are not possible with conventional design. These special features and benefits include:

1. automatic retraction and extension of the landing gear without operator assistance and with no additional components required;
2. automatic high volume air cooling while on the ground and automatically restricted air flow during flight with no operator assistance required and with no additional parts required;
3. variable thrust vector alignment for optimum flight performance with no additional parts required;
4. positive yaw/roll coupling instead of adverse coupling as is the case with conventional design;
5. overall airplane efficiency and performance significantly increased compared to conventional design;
6. up to 100% aerodynamic ground effect is automatically provided, but only when needed, during takeoff and landing operations;
7. improved control response and handling quality with less tail area required over conventional design;
8. greatly reduced height and profile resulting in reduced ground handling and service facility requirements;
9. increased safety with simple arresting device.

STATEMENT OF A PROBLEM

Airplane design has always been confronted with a challenge as to how to design a streamlined, efficiently shaped fuselage and yet provide ground clearance for the body and propellers or jet units. This is especially critical during takeoff and landing rotations. Presently, huge airliners down to the smallest airplane show that this problem has not been resolved. The conventional design of the fuselage of a commercial airliner shows that not only is the aft portion of the fuselage not aligned with the airflow but actually the aft body shape during cruise and related phases of flight is creating a negative or downward lift. Thus, present day airplanes are designed for a phase of operation that takes a few seconds of time and not a flight that consumes hours of time. This inefficient design not only wastes fuel but the upward tilted aft body presents others problems as well. Current design requires an immense vertical tail jutting skyward resulting in an airplane requiring high scaffolding and tall hangars to service and accommodate them. However, more important than the increased cost to operate and service such aircraft is the reduced effectiveness that such a tail provides. During takeoff and landing the lower part of the vertical tail is in the turbulent wake of the fuselage. Also, when the rudder is deflected it creates a roll moment opposite to the desired direction of the yaw turning force due to its high position. This contributes to the large tail area requirement.

Aside from ground clearance requirements, if an aircraft could be designed with an aft body aligned in the direction of the downwash airflow then the drag force would be reduced. Also, if the vertical stabilizer and rudder could be oriented to project downward beneath the aft end of the fuselage then the tail area could be reduced because the tail would be more effective. The present invention would eliminate these problems as explained herein and a more efficient and better controlled airplane would result.

Note that the radical design change described herein will affect pitch trim compared to conventional design. Increased positive trim can be gained by reflexing the main wing camber or simply by raising both ailerons slightly upward equally. These changes would supplement canard lift or aft horizontal tail loading to offset the main wing negative moment if it is required.

BACKGROUND—DESCRIPTION OF PRIOR ART

Over the years numerous attempts have been made to devise a way to combine the utility of an automobile with the advantages inherent with the freedom and swiftness of flight. Previous attempts have concentrated on how to fold and store the wings and other flight components, then, either to carry the flight gear on the vehicle while traveling on land or to secure the flight gear at the landing site requiring a return trip to continue the flight. Neither of these two methods has proven to be practical for reasons explained herein. However, there is one known example of a third method of achieving a practical combination vehicle in which the flight components are folded into a unit comprising a trailer that can then be towed behind the auto unit that is thus shed of the components that make land travel impractical. While this method appears to be the most practical and usable vehicle its acceptance in the marketplace demonstrates that it is not much more than a novelty. The reason is that basic inherent problems of such a combination were not addressed nor remedied resulting in an airplane with a 300 pound weight penalty requiring more than a 50 percent increase in power to handle the airplane.

The above auto-trailer concept was proposed by M. B. Taylor in U.S. Pat. No. 2,767,939 to Aerocar, Inc. (1956) entitled "Flying Automotive Vehicle Assembly." U.S. Pat. No. 2,434,068 to Geisse (1948) entitled "Roadable Airplane with Folding and Detachable Wings" combines the features of both of the first two above mentioned concepts, namely a vehicle that can fold and carry the flight components on the automobile or can detach the folded components and leave them behind as desired. U.S. Pat. No. 2,624,530 to J. H. Hanssen (1953) entitled "Vehicle Comprising an Auto-Airplane Combination" was designed to leave the flight gear at the airport with the automobile unit capable of traveling on the roads being limited in use to people who travel mainly between one town or area and another and returning back to the origination point of the trip.

All of the prior attempts have fallen short of their objective of a practical and usable combination vehicle because they have not solved the basic problems inherent in such a combination. These inherent problems are, and the concept's solution follow:

(a) A most fundamental problem of combining an auto with an airplane is that of propeller clearance which requires at least a part of the vehicle must be elevated from the ground which means it is in conflict with requirements of a stable, low center of gravity for the automobile. All prior art has not successfully solved this problem because of weight penalties or time and effort requirements in making a changeover from one mode of travel to the other. However, the placement of the propeller at the aft end of the fuselage provides a means by which a relatively small portion of the structure need be so elevated. This was employed by the above U.S. Pat. No. 2,767,939, auto-trailer combination and has proven to be a reliable means of providing thrust to the airplane. One of the drawbacks to this concept is that the thrust vector is actually oriented downward and the aft fuselage is not aligned with the airflow which both reduces fuel efficiency and handling quality of the airplane. The proposed concept eliminates these problems as explained below.

(b) Prior attempts to fold, retract, collapse, detach, and related means of ridding the vehicle of unwanted flight surfaces have resulted in claims of quick conversion from one configuration to the other and back again with little needed effort or time spent. U.S. Pat. No. 2,767,939 claims that the flight gear is easily assembled into a trailer in only a few minutes. However, in that scheme as with other prior art, the operator must exit the vehicle to accomplish this changeover which is an unacceptable procedure. For the vehicle to be readily useful by the general public under all normal weather and road conditions the changeover must be made by a simple procedure without the operator having to leave the vehicle at any time. The proposed embodiment of the combined machine would employ a simple folding of only the outer panels of the airplane by hand operated means without the operator leaving the vehicle. The entire tail assembly including the propeller and vertical tail would remain as is without any changeover required in the conversion. Thus the conversion is made without stopping the vehicle at any time.

(c) Prior efforts have resulted in vehicles that have a relatively high center of gravity that makes ground travel unstable and therefore limited in performing as an automobile. No solution to this problem has heretofore been offered. The jointed fuselage concept solves this problem by allowing the road clearance of the vehicle to be at the minimum legal limit. This means that the center of gravity of the road vehicle can be brought down to an acceptable height above the road because the wing, engine, operator and other major weight items can be placed lower than heretofore was possible. An additional benefit of this minimum vehicle ground clearance is the aerodynamic ground effect or air cushion effect of having the wing close to the ground.

(d) Prior combined vehicle configurations have not adequately solved the requirement to have a small, low side profile with the vehicle in the land travel mode. The prior attempt to have an auto towing a trailer has resulted in an unwieldy, large elevated side area that is not safe or practical for road use, especially considering the lightness of the towed structures. The articulated fuselage concept allows placement of all heavy components at or near minimum levels during all phases of road travel and thus the profile is low and smaller in size.

(e) Some of the prior attempts to carry the large, light weight flight structures have been made by simply carrying them on airframe and undercarriage of the airplane with some of the structure being cantilevered out from the undercarriage support. U.S. Pat. No. 2,767,939 solved this problem with the trailer concept. Thus, the problem of carrying such structures on the road where roadway air turbulence and cross-wind forces exist was reduced. The invention presented herein likewise employs a third wheel configuration but accomplishes it without the large side area or elevation or conversion tasks of the prior art.

(f) The prior U.S. Pat. No. 2,767,939 had a flight configuration in which the aft fuselage was canted upward to the rear with a propeller oriented so that forward thrust was aimed slightly downward. Both of these orientations were undesirable but necessary because of the fixed position of the aft fuselage structure. The jointed fuselage feature allows the thrust vector of the propeller to be directed in the optimum direction depending on the flight condition. A fixed position of the thrust vector is at best a compromise and in the above cited prior art together with the upward rearward slope of the body was necessitated by the requirement to provide propeller ground clearance at liftoff. Thus, for a phase of operation that consumes less than a few seconds of time a flight of hours is compromised.

(g) There is an old saying in aircraft design and construction that "Hell holds an awful fate for those who add a little weight." This is a basic and fundamental problem with the subject combination vehicle. Any of the prior art attempts can be shown to have a weight penalty that must be borne by the vehicle in its flight mode. The addition of special hardware to fold, detach, store, secure, and related requirements of the road vehicle all add "a little weight." In the prior art there appears to be no significant attempt to compensate for this weight penalty. The articulated fuselage all but eliminates fuselage or body weight carrying structure because the low wing-engine-operator-main load support wheel-power transmission and related gear are all coupled together with minimal or no space separating these major heavy items thus providing the flight vehicle with a significant weight reduction of lengthy high load path structure. Also, there is another aspect of the proposed invention that reduces weight. That is the above mentioned ground effect that aids in lowering liftoff and touch down speeds and rollout distances which in turn means that a smaller wing of lighter weight can be employed, all other conditions being the same.

A number of unique features that are meaningless or impossible without the jointed fuselage are not discussed here. These special features (see the "Unique Features" section) have no prior art as they are peculiar to the radical design of this invention.

OBJECTS AND ADVANTAGES

The objects and advantages of the articulated fuselage concept are:

(a) to provide the lowest possible placement of the propeller relative to the ground while providing assurance that the propeller will not come into contact with the ground at any time;

(b) provide a vehicle that can be converted from a land travel vehicle to a flying craft and then can be converted back to a land vehicle without the operator exiting the vehicle and without any expenditure of time or labor that would delay the smooth and continuous travel of the combination. This is to eliminate any downtime or inconvenience that would be a deterrent to the use and acceptance of the combined vehicle;

(c) to provide the lowest possible ground clearance of the vehicle to ensure stability, control and safety as a road car;

(d) to provide as low a center of gravity location as is possible for the land traveling vehicle to ensure stability, control and safety;

(e) to provide as small and as low a side profile area as is possible to minimize the undesired effects of air turbulence and cross-wind forces on the vehicle in the road travel mode;

(f) to provide a means of streamlining the aft end of the fuselage to be more in line with the direction of the slipstream air flow;

(g) to provide a means of aligning the propeller thrust vector to the optimum desired direction;

(h) provide assurance that the inherent weight penalty of the combined vehicle is kept to a minimum so that such a penalty will not make the aircraft flight to be inefficient and impractical considering fuel consumption commensurate with the payload carried;

(i) to provide a combined vehicle that has no cantilevered structure that is not supported by a ground supporting wheel to ensure safe ground travel handling and control in any weather or road condition that would normally be encountered by any motor vehicle;

(j) to devise a way to produce the subject combination vehicle using existing state of the art hardware and materials at a cost not to exceed the nominal cost of a current family automobile;

(k) to provide a combination vehicle that, in the airplane mode, has primary structure load paths held to the shortest possible lengths to ensure a light structure and maximum safety;

(l) provide a means to eliminate adverse roll and improve banking characteristics of the airplane to make the airplane easier and safer to fly;

(m) provide a means to take advantage of aerodynamic ground effect during the liftoff and landing phases of airplane flight to reduce the required takeoff and landing speeds and rolling distances and also to make these phases of flight more "forgiving" of pilot error and thus increase safety;

(n) provide a vehicle with the minimum complexity and weight of undercarriage landing and support gear commensurate with applicable motor vehicle codes;

(o) to provide a road vehicle that can easily be maneuvered intact into or out of a standard size single car residential garage;

(p) provide a combined vehicle that is no more demanding of physical strength of the operator and is as quiet and smooth to operate as a family automobile with a trailer in the auto mode of travel;

(q) provide an airplane that is incapable of stalling and has no unsafe flight characteristics providing normal flight limitation and piloting procedures are observed and followed;

(r) provide all of the herein described objectives and advantages, as applicable, to any airplane including airliner and air cargo airplanes noting that references to road travel would apply to runway, taxiway, and parking areas and references to propellers is expanded to include air inlets and jet exhausts or other means of propulsion;

(s) provide a means to have redundancy of control about all three airplane axes of pitch, yaw and roll;

(t) utilize aircraft structure, including folded flight components, as crushable barriers to protect the occupants of the vehicle while traveling on the ground in case of accidental impact;

(u) take advantage of the jointed fuselage displacement to automatically retract/extend the landing gear without operator assistance;

(v) take advantage of the jointed fuselage displacement to provide automatic control of engine cooling air for the different air volume rate of flow conditions including ground operations, climb and cruise which are similar, respectively, to open, trail, and closed positions of an engine nacelle cowl flap or flaps;

(w) devise a way to include conventional horizontal tail design with the tail at the aft end of the airplane by providing automatic linkage to maintain pitch control and pitch trim with manual override control regardless of aft body displacement;

(x) devise a way to extend the span of the canard wing without adding operator requirement to extend or retract the added span in a combination conveyance;

(y) devise a way to control the displacement of the aft body throughout its arc with provision to passively hold any selected position and provision to release the aft body so that aerodynamic forces can passively place the body in a streamlined orientation;

(z) take advantage of the downward projecting tail to install an arresting device capable of engaging unprepare surfaces providing an arresting force to the conveyance during emergency landings without penetrating prepared surfaces including dirt landing strips:

Most of the above listed objectives and advantages of the subject invention have been met by the proposed vehicle and most of those listed have not been satisfied by the prior art.

DRAWING FIGURES

FIGS. 1A to 1D, respectively, show the side view of the combination vehicle parked with the wings folded and the propeller in the stowed horizontal position, next at start of takeoff roll (brake release,) then at liftoff and full rotation of the front body (maximum angular displacement of the joint) and finally in the climb-out condition with the tail down in the optimum location for climbing.

Figure 2A:
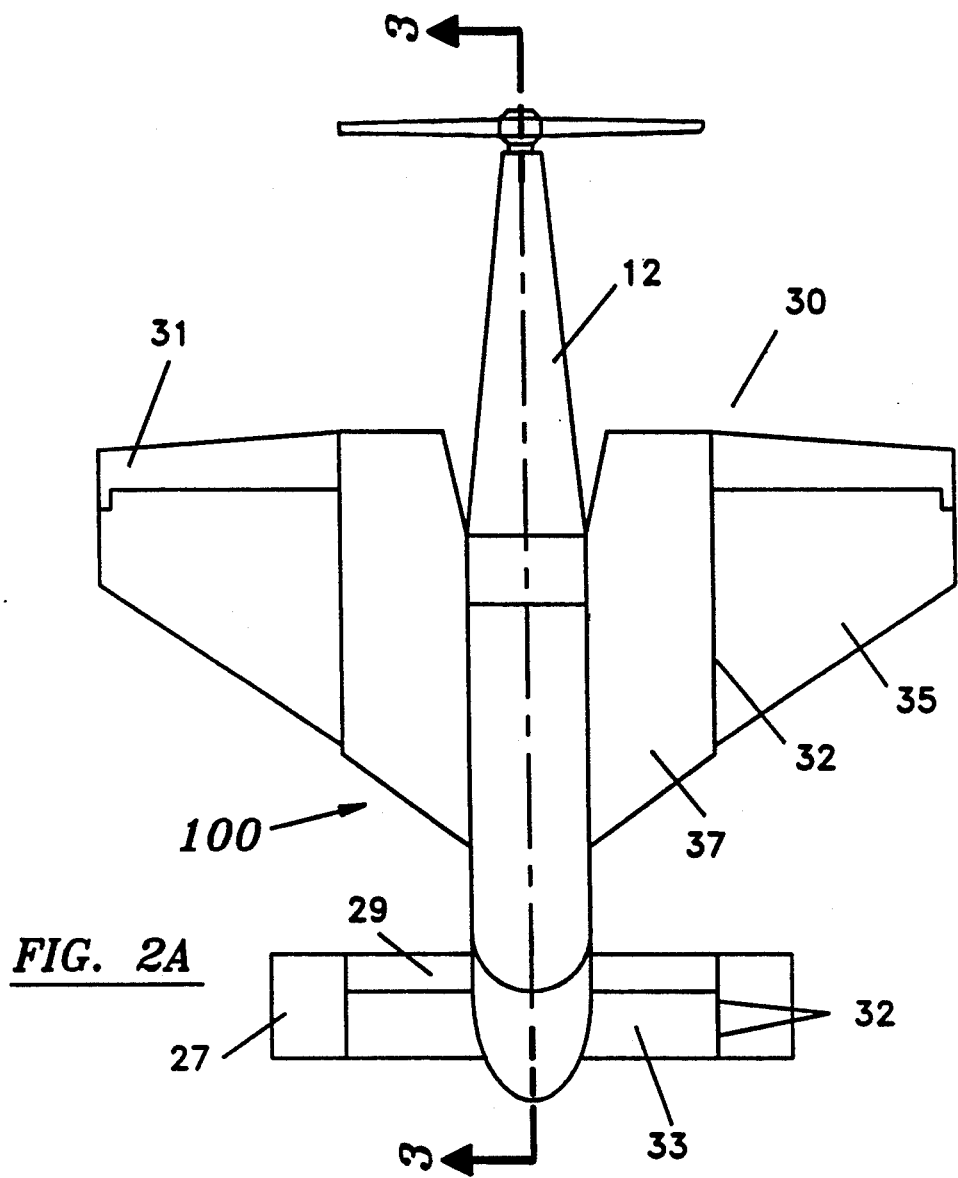
Figure 2B:
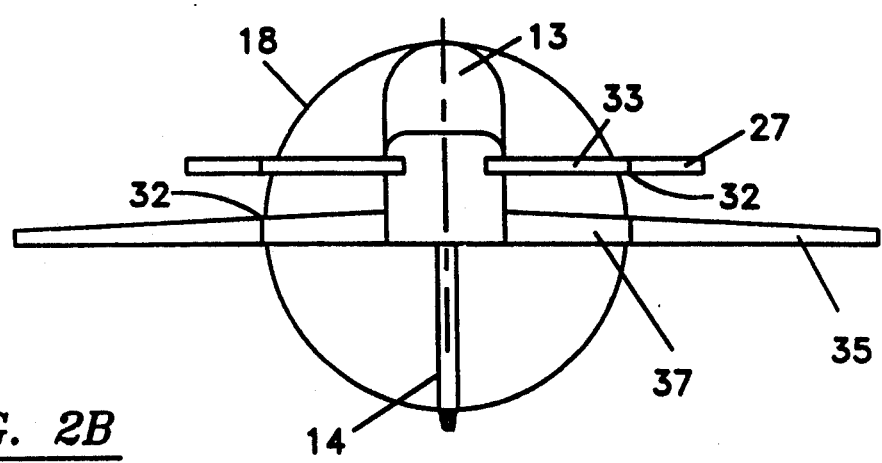
Figure 2C:
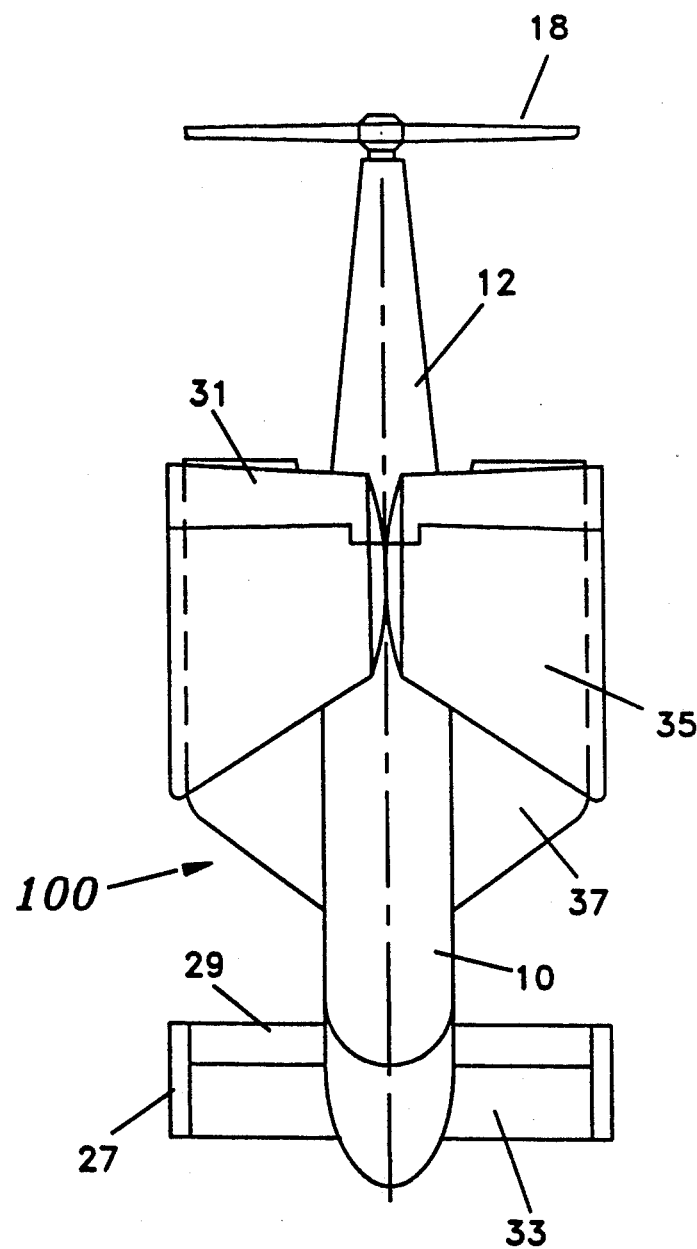
Figure 2D:
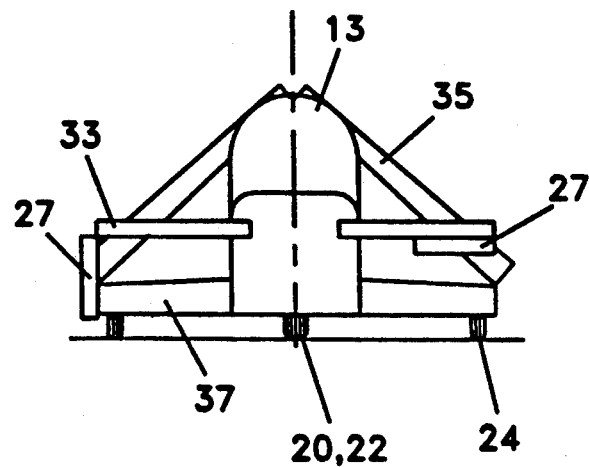

FIGS. 2A and 2B show the plan view and the frontal view of the combination vehicle in the flight configuration. Similarly, FIGS. 2C and 2D show the same views with the vehicle in the road travel wings folded configuration. The manner of folding the wings is not a part of the invention but is shown as an illustration of one way to reduce the overall size for land travel.

FIGS. 1A to 1D illustrate a typical embodiment of the articulated fuselage concept. These figures show, respectively, the sequence of configurations of the combined vehicle from a static, parked configuration through brake release at the start of the takeoff roll through liftoff rotation and into the climb out condition where aft body 12 is free to rotate downward to an optimum streamlined orientation. The level flight or descending flight phases of operation would be performed with the aft body at some optimum location between full down displacement relative to the front body 10 to a partial down position depending upon the flight parameters.

The plan and frontal views of the combined vehicle depicted in FIG. 1 are shown in FIGS. 2A and 2B. These views show a typical configuration of the main wing 30, canard 28, and overall assemblage in the flight configuration. Similarly, FIGS. 2C and 2D, together with FIG. 1 show the complete exterior views of the vehicle in the land travel mode including all wheels 16, 20, 22, and 24, minimum ground clearance, low profile and streamlined features.

Figure 3:
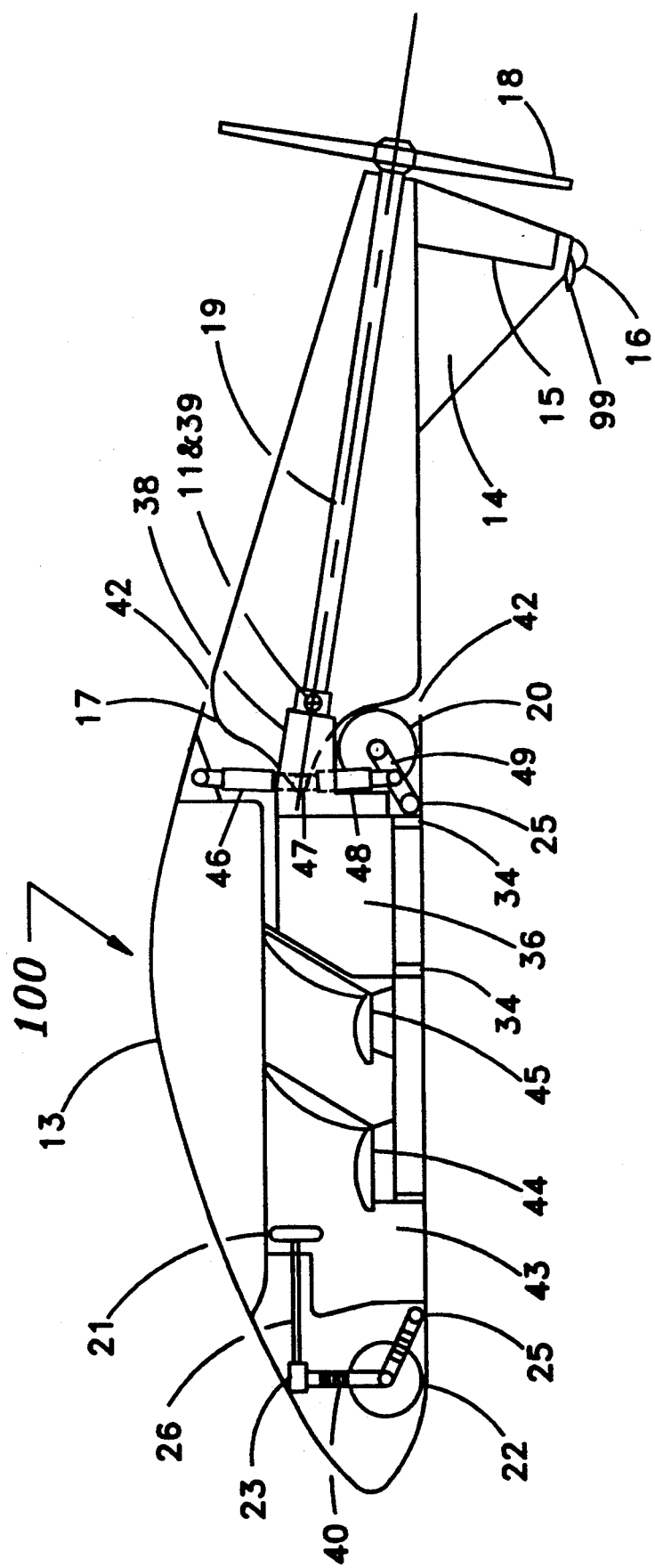

FIG. 3 is a cross-sectional view taken along the line 3—3 of FIG. 2A showing the engine 36, aft body pivot 11, transmission 38, spline drive and U-joint 39, propeller drive shaft 19, aft body control struts 46, aft body forward extension 17 and its pivot 47, main gear shock struts 48, arrestor hook 99, and other components described elsewhere.

Figure 4:
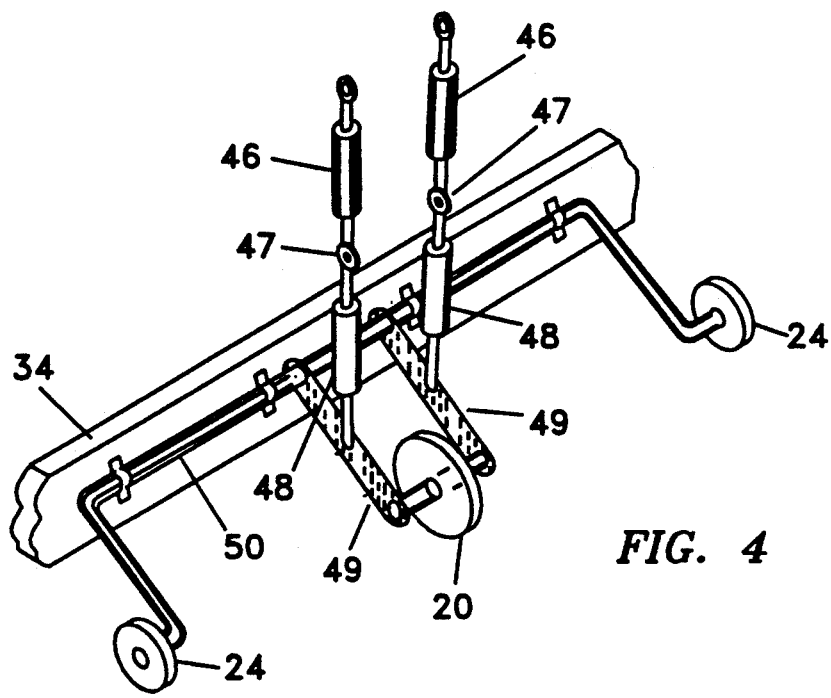

FIG. 4 shows the main gear including the outrigger wheels 24, wheel shock absorber struts 48 and aft body actuator struts 46, all of which are mounted to the wing spar 34. The joined ends of the struts are attached to the aft body forward extension pivot 47 shown in FIG. 3. The aft body actuator shock absorber struts 46 connect the pivot 47 to an anchor point on the front body.

Figure 5A:
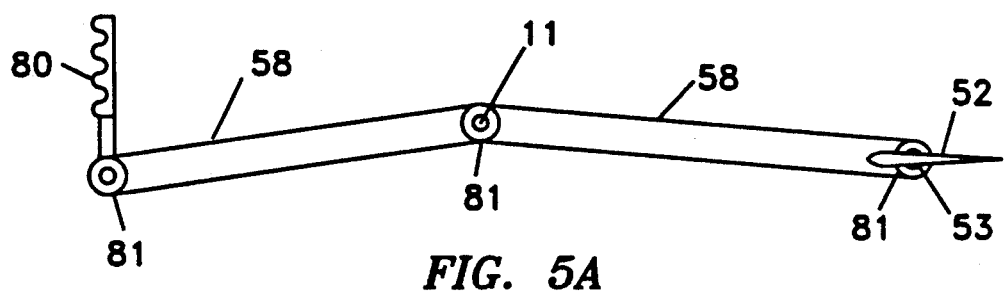

FIG. 5 is an illustration of an optional feature not required in the proposed embodiment. A horizontal tail 52 can be mounted on the aft end of the aft body that is passively programmed to maintain pitch trim regardless of the aft body displacement. Provision is also made to allow manual adjustment while in flight to alter the set program to any pitch up or down trim required. FIG. 5A shows a simple cable 58 and pulley 81 arrangement for a one-piece tail application. The up or down swing of the tail 52 does not affect its pitch orientation but movement of the operator control stick 80 controls the tail pitch angle via the aft body pivot 11 pulley which is bolted to a second pulley at the common pivot 11 thus all three pulleys 81 rotate in unison. One cable must be reversed for proper control direction but it is more easily visualized as it is shown and it functions either way.

Figure 5B:
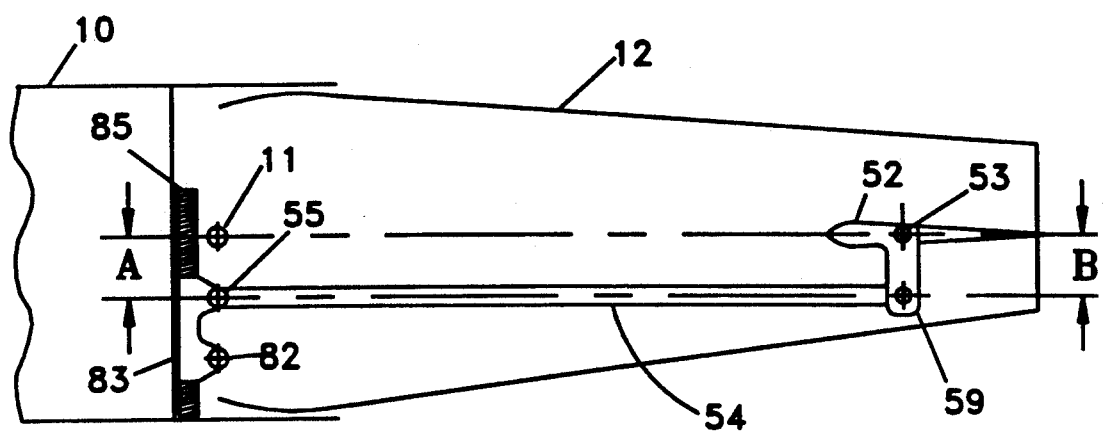
Figure 5C:
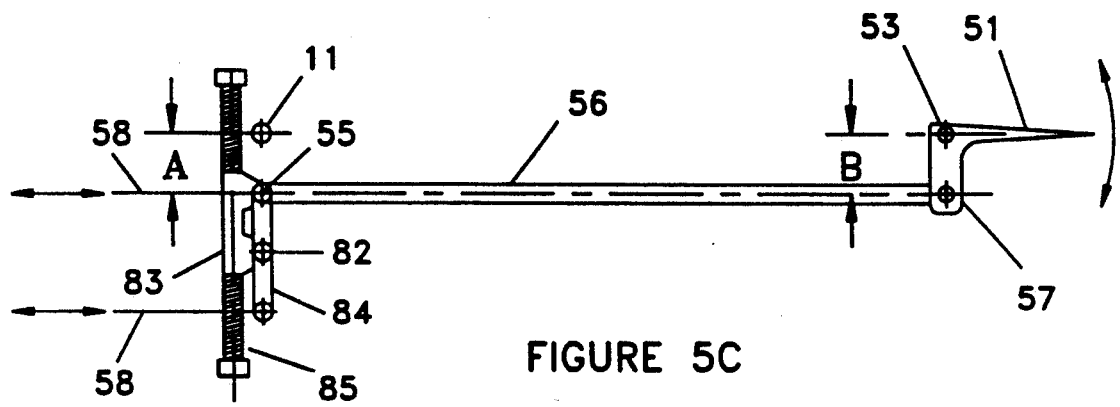

Alternatively, better application is the conventional two-piece tail shown in FIGS. 5B and 5C. FIG. 5B shows the programmable forward stabilizer 52 connected to a movable pivot 83 via a position lever 59 and a rigid link 54. Pivot 83 is mounted on a threaded shaft 85 that is rotated by the operator to adjust its position. If dimension A equals dimension B then tail orientation (pitch angle) does not change with displacement of the aft body. If dimension A is smaller than dimension B then pitch angle increases with a down swing of the aft body. FIG. 5C shows the elevator 51 and its position lever 57 and its connecting link 56 which is connected to the movable pivot 83 by a pivot 82 that allows the elevator control bar 84 to be rotated via control cables 58 by the operator. This arrangement of the combined linkage 54, 56 and common pivot locations 53, 55 and common dimensions A and B allow the forward pivoted stabilizer 52 and elevator 51 to move in unison and yet allows the elevator 51 to be free to move up or down regardless of aft body position. FIGS. 5B and 5C could be combined as one figure but are separated to show the stabilizer and elevator members separately for clarity.

Figure 6:
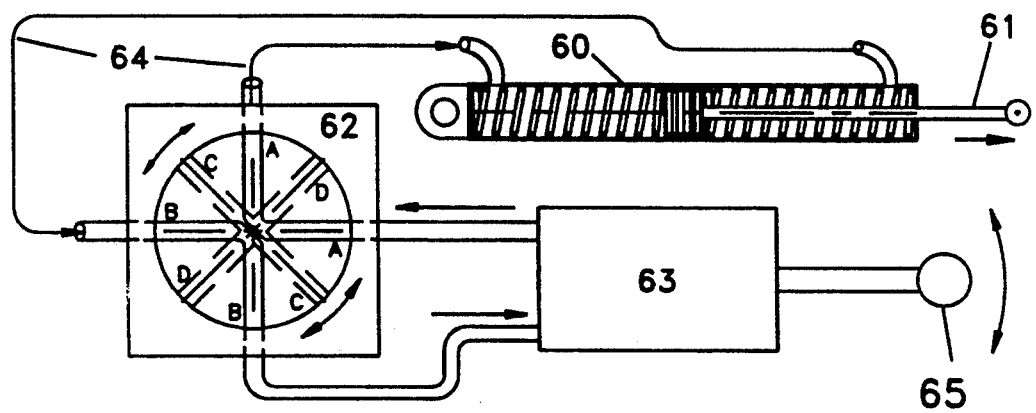

FIG. 6 is an illustration of the pneumatic system that is used to control, passively hold, passively release, absorb shock inputs and dampen unwanted oscillations or motions of the aft body. Passive hold does not require operator assistance or attention after a position of the actuator is selected because the gas (or air) on either side of the actuator piston 61 is sealed off by closed ports of the control selector valve 62. Similarly, the passive release mode allows the gas on either side of the actuator piston 61 to flow freely through ports in the selector valve 62 from one side of the piston to the other side thus aerodynamic forces on the aft body can passively align the aft body to a streamlined position. However, the operator can override this passive positioning of the aft body by switching to the "control" mode or a fixed position can be set by switching to the passive "hold" mode.

The pneumatic system also includes actuators to fold or extend flight surfaces and, as an option, can be used to extend or retract the nose gear. The system consists of actuator shock absorber/damper struts 60, a control system selector valve or valves 62, an air pump 63 (handle 65 operated or powered) and connecting pneumatic lines 64. The control selector valve contains a closely fitted rotary element in a solid housing with various passageways that connect the air pump with the ends of the actuator piston chambers as shown. Thus passageway "AA" is separate from passageway "BB," passageway "CC" is separate from passageway "DD," etc. The illustration shows how rotation of the rotary element can align the ports of the valve to provide pressure to either side of the actuator in either direction and can allow free flow of the gas through AA or BB ports for "release" mode of operation.

Figure 7:
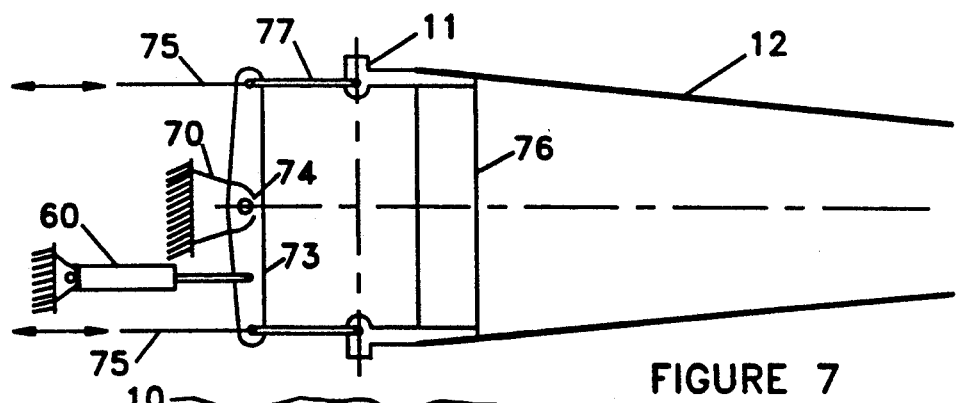
Figure 8:
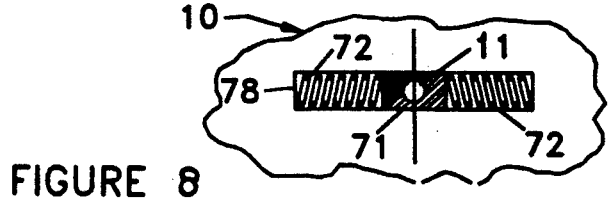

FIGS. 7 and 8 illustrate an optional feature not required in the proposed embodiment. They show a means of adding freedom to the aft body to allow it to swing left or right without a central pivot. The left side and the right side pivots 11 are held in blocks 71 that slide in captive grooves or tracks 78 mounted in the front body 10 with centering springs 72. FIG. 8 is a partial side view of FIG. 7 showing the front body 10 mounted sliding pivot block assembly. Singletree bars 77 are attached to the journal pivots which are connected to the rudder pedal control cables 75. Pneumatic strut or struts are attached to the singletree 73 and anchored to the front body to damp out unwanted motion.

One strut or two struts 60 could be tied into the pneumatic system to provide backup redundant control of yaw or could be the primary control of yaw, with its "hold" feature to lockout any yaw of the aft body with only rudder used for control. A Combination of rudder and aft body displacement could be used to increase the effective rudder area for directional control or the rudder could be used as a servo to displace the aft body and vertical tail for directional control. The singletree 73 central pivot 74 is attached to the front body anchor point 70 and damper struts or actuator struts 60 are likewise anchored to the front body. Aft body loads are carried through an aft body pivot ring 76 which distributes the pivot 11 loads to the aft body. However, no singletree is needed if a small amount of fore and aft movement of the aft body is allowable. The centering springs with appropriate cabling, in that case, would suffice.

EMBODIMENT DESCRIPTION

Figure 1C:
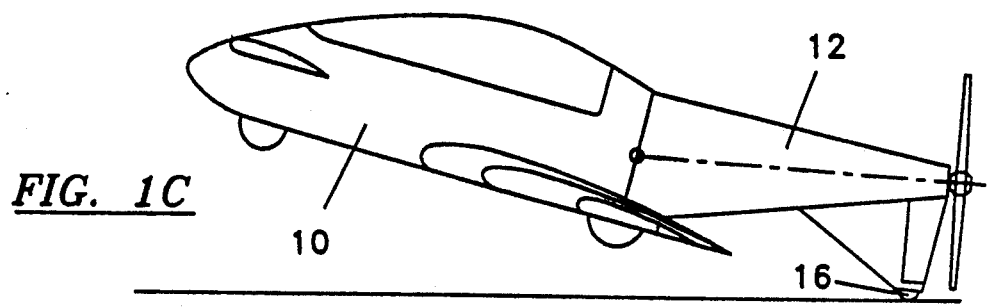
Figure 1B:
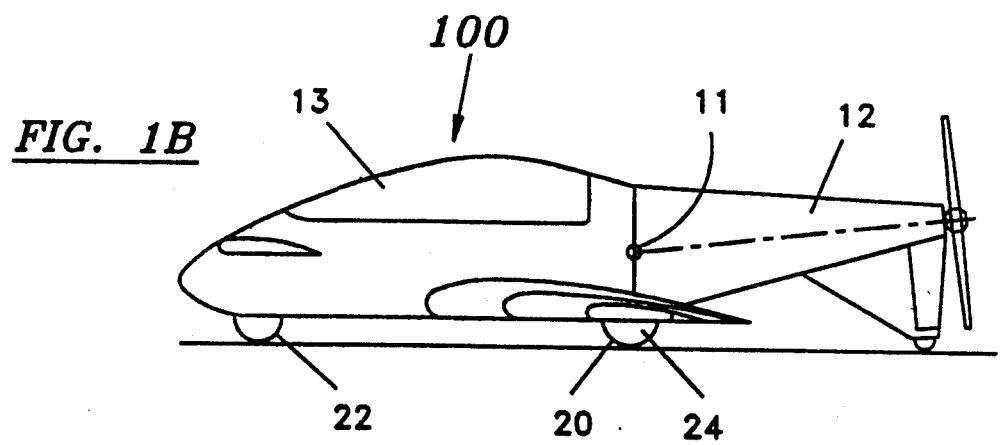
Figure 1A:
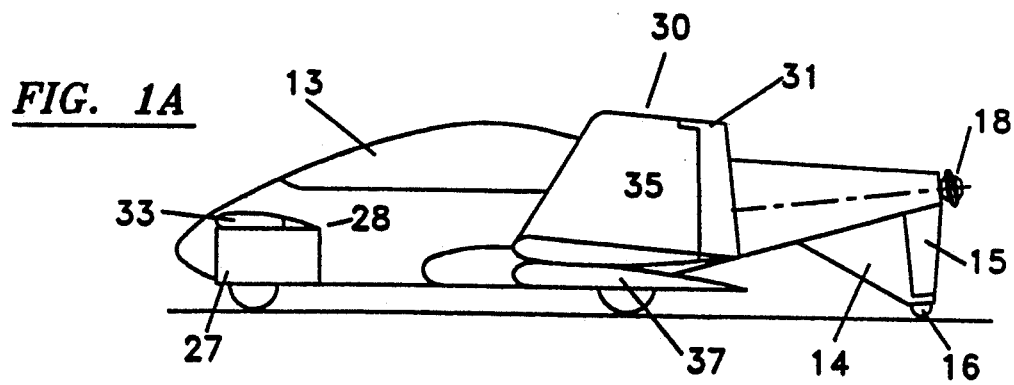

Referring to the drawings, FIG. 1A shows the combination vehicle 100 in its ground travel mode with main wing 30 and canard 28 folded and propeller 18 shown in a level position. FIG. 1B shows the craft ready for flight with the main wing 30 down and locked and the canard 28 in the up and locked position. FIG. 1C shows the airplane with the front body section 10 lifted off the ground and the aft section 12 support wheel 16 still in contact with the ground. In FIG. 1D the airplane is fully airborne with the aft body 12 down in a streamlined configuration.

The fuselage pitch joint 11 allows the front body section 10 to be at minimum height above the ground surface with the aft body section 12 and propeller 18 supported by the vertical tail 14 and the tail wheel 16 as shown in FIG. 1B. FIG. 1D shows how the tail assembly lowers to a streamlined position.

FIG. 2A shows the combination vehicle in a flight configuration with wings extended. The ailerons 31 are located only on the outer panels 35 that fold about top mounted hinges 32. The main wing center section 37 has no flaps. The main wing outer panels 35 fold about 130 degrees from the down, flight position to the ground stow position as shown in FIGS. 2C and 2D. The wing panels come together against stops at their tips and against the front body 10 stop aft of the canopy 13 thus forming a secure, rigid structure for ground travel. The folded panels offset center section 37 lift.

Conversely, the canard wing outer panels 27 do not contain the elevator 29 which terminates just short of the fold line as shown in FIG. 2A. Also, conversely, the canard outer panels fold 180 degrees about two hinges 32 downward to an up side down stow position for ground travel to nullify lift. However, for some ground operations, including parking, it is advisable to allow the panels 27 to hang downward from the center section 33 shown in FIG. 2D (left side.) The propeller does not rotate when in the auto vehicle mode.

FIG. 3 shows the engine 36 and the power transmission housing 38 are coupled together and rest upon the wing spars 34. The main wheel 20 retracts into the fuselage at the juncture between the two body sections. The main wheel 20 is powered by a drive shaft from the transmission 38 that remains disconnected until the wings are folded for ground travel. The transmission housing contains a clutch and selector gears that connect the engine output to either the pusher propeller 18 or the main wheel 20. The lighter secondary support wheels 24 are located in line with the main wheel 20 and displace about wheel linkage pivot 25 on a transverse shaft 50 shown in FIGS. 3 and 4. The secondary support wheels 24 are not connected to engine power and are free to turn in unison with the main wheel 20 when the nose wheel 22 causes the vehicle to turn left or right.

The propeller drive shaft 19 is connected to the transmission with power delivered through a drive spline and flexible U-joint 39 which is aligned with the fuselage pitch pivot 11. The aft body 12 is configured with an aft body extension 17 that provides an air gap 42 that allows cooling air to escape from the engine area at a restricted rate during flight to maintain engine operating temperature and reduce cooling air drag and at a greater rate during ground operations when the aft body 12 displaces upward. The shock struts for the main wheel 20 are attached to the aft body forward extension pivot 47 at each side to the fuselage. The aft body actuator shock absorber struts 46 are also attached to pivot 47 and to the front body anchor point shown in FIG. 3. The secondary support wheels also each have shock struts not shown which together with the lighter wheels 24 retract into the main wing center section 37 enclosure fairings not shown.

FIG. 3 also shows the location of the operator seat 44 and passenger seat 45. The nose wheel 22 is shock mounted on a steerable wheel shock strut 40 assembly that the operator controls via a steering wheel 21, steering box 23, and control shaft 26 that has a telescope type spline sliding drive to provide elevator control by the fore and aft position of the steering wheel 21. The elevator pivot shaft passes through the front body 10 and is connected to this sliding control shaft 26 by direct linkage not shown.

Ventilation air enters the fuselage in front of the nose wheel 22 for cabin ventilation. The primary cooling air enters the engine compartment at its forward end via side scoops not shown and mainly exits out through the air gap 42 between the two body sections 10 and 12 with some air drawn out at the rear end of the aft body 12 at the propeller 18 hub. The rudder 15 at the trailing edge of the vertical tail 14 is controlled by cables not shown routed by a low friction guide at the pitch pivot 11 to minimize the effect of displacement on the cables which are attached to rudder pedals not shown. The rudder 15 is operational at all times regardless of vehicle 100 configuration but can be stowed.

Small, legal size headlights are enclosed within the leading edge of the wing at the outer ends of the center section and standard clearance and tail lights are located at the exposed wing and canard fold joints and the top and bottom of the vertical tail all not shown. Similarly, aircraft required lighting is located in the conventional places with the vehicle in the flight configuration.

The operator seat 44 is adjustable fore and aft to ensure optimum use of the cabin space. Hardware and equipment not shown, including batteries and radio gear, are located mainly in the rigid main wing center section 37 and the front end of the cabin 43.

There is built-in damping in the two aft body shock struts 46 that are attached off-center between the aft body 12 and the front body 10 shown in FIG. 3. Also, these shock struts carry preload to provide the proper operation of the aft body. Air turbulence and other sources of undesirable excitations to or between the two bodies are damped out and controlled by the aft body shocks. Also, during surface travel, a small aft body support wheel 16 shock strut aids in damping out ground induced excitations to the aft body. The aft body shocks are double-acting shocks designed to apply compressed spring down force on the aft body outer end when the aft body is displaced upward while on the ground and conversely the shocks apply an upward preload spring force when the tail end of the aft body 12 lowers to a streamlined position in flight. An override control is provided that allows the operator to control the aft body shocks to lift the body off of the ground as required during ground operations where special conditions exist.

EMBODIMENT SUMMARY

The aft body is pivoted to swing up or down in an arc. The vertical tail is comprised of a fixed forward stabilizer to which a rear mounted rudder is attached. This tail projects downward beneath the aft end of the aft body. A pusher propeller is mounted at the aft end of the aft body via an extension shaft which has a U-joint and spline drive as shown in FIG. 3. A single engine mounted at the bottom aft end of the front body rests upon the main wing spars and powers either the propeller or the main center power wheel via a clutch, drive selector gears and transmission gears all located within the housing attached at the rear of the engine shown in FIG. 3.

Steering is provided by the nose wheel mounted at the fuselage front end. The narrow fuselage contains two seats in tandem with floor mounted rudder pedals at the sides of the body that are connected to the rudder cables. More centrally located auto controls are mounted inboard and adjacent to the rudder pedals in the conventional clutch, brake, and accelerator pedal layout as in an automobile. The single nose wheel and the main rear power wheel are in tandem with outrigger secondary support wheels aligned with the rear main wheel and turn in unison with the main wheel when the nose wheel is deflected to the left or right. No power is connected to the outrigger wheels which are positioned just inboard of the nominal eight foot road width limit. The main and two outrigger wheels are all mounted on a common pivot shaft which spans the central fixed wing center section all shown in FIG. 4. The anchor supports are mounted to the rear face of the rear wing spar. Thus, all three wheels are automatically raised or lowered in unison by the main gear shock absorber struts which are linked to the aft body forward extension pivots of the aft body.

Gear extension or retraction can be gang linked to the nose gear via linkage not shown so that all support wheels operate in unison. However, the nose gear is within reach of the operator, and thus manual operation can be provided as an option either mechanically or by extension to the shock strut as explained elsewhere. A protective Teflon type fuselage nose skid would prevent damage if the operator failed to lower the nose wheel.

Both the main rear wing and the smaller canard front wing fold to the required nominal eight foot road limit width. The main wing is flush with the bottom of the fuselage for ground effect and is mounted at the aft end of the front body and extends behind the main support gear to take full advantage of ground effect during rotation. The canard is mounted higher than the main wing on the front end of the fuselage for aerodynamic reasons. The main wing fixed non-folding area is maximized. The outer panels can be released from locks located on the wing spars to fold up and over the fuselage upon top wing surface mounted hinges to a secure and rigid triangular structure against each other and against the front body locks not shown. the main wing has ailerons mounted at the trailing edge of the outer panels only and the ailerons are actuated by the auto steering wheel by cables in flexible sleeves. Aileron airfoil displacement is less than usual because of the effectiveness of the inverted rudder that aids in positive yaw-roll coupling. This system is normally active at all times regardless of wing position or operational mode but can be disengaged if required.

Conversely, the canard outer panels do not have elevators which terminate at the outer ends of the center section. The outer panels fold downward to a 180 degree upside down stow position against the center section to negate canard lift at road speeds. The outer panels provide additional canard lift and yet comply with the nominal eight foot road limit. Note that these panels are not mandatory as the proposed configuration will fly adequately without them but they are added to reduce wing loading and lower liftoff and landing speeds. The outer panels rotate about bottom mounted hinges attached to the spars and have an up lock and folded stow lock not shown. Operation of the panels can be by a cable lanyard or by pneumatic actuator struts manually operated by the operator. There is needed visibility of the ends of the canard where the general public is concerned during slow ground travel and parking which is satisfied by allowing the panels to hand down 90 degrees. Dampers at the hinge restrict unwanted oscillations due to vehicle motion. This feature prevents walking into the ends of the canard. The fixed central canard airfoil has elevators at the trailing edge which are actuated by the sliding control shaft that has the steering wheel facing the operator. The elevator pivot shaft passes through the fuselage and has a control horn that is linked via a bearing to the sliding portion of the steering shaft that has a spline drive to the nose wheel steering column. Note that the canard outer panels can be allowed to hang 90 degrees down and can be allowed to lift upward to the fully extended stops in a completely passive manner except for the built-in damper, thereby eliminating this functional requirement of the operator.

The clear plastic canopy is hinged on the right side and can be partially raised during ground operations. Engine cooling air is provided primarily by side scoops not shown, at either side of the fuselage with the majority of the air exhausting through the air gap between the front and aft body interface. Some air is drawn into the cabin from the nose inlet ducting for ventilation and cooling. Control cables and ducting are routed to either side of the cabin. An override control is provided in the cockpit to lift the aft body as required. However, the aft body can operate passively during all flight and ground travel operations being preloaded and restricted to offset its weight and dampen its motion to a degree that allows it to follow the prevailing airflow in flight and the ground during surface travel.

However, the shock strut that controls aft body motion is a double acting strut that can be controlled by the seated operator to override its position in either the up or down position by altering air pressure on either side of the strut piston if required during flight or ground operations. Added down force on the shock strut spring is automatically created when the aft body displaces upward during ground travel to ensure proper road travel performance. Conversely, an upward spring force is created when the aft body lowers to a streamlined position during flight as illustrated in the design of the actuator in FIG. 6. The interface between the front and aft bodies is so contoured that a high rate of cooling air is provided on the ground with the aft body in an upward displaced position and a much reduced air gap and thus much restricted air flow is automatically provided with the aft body displaced downward during flight to prevent unnecessary cooling air drag and lowered engine operating temperature. The arresting hook is describe elsewhere.

Note that the proposed embodiment of the invention is a special application of the jointed fuselage concept with the combination conveyance adaptation aimed at increasing the utilization of smaller aircraft for the general public. The proposed vehicle is configured and equipped with compromises leaning toward lower road speeds and non-aerobatic flight.

DESCRIPTION—STRUCTURE

The structure for implementation of the articulated fuselage concept generally exists in airplanes of various types in use today except for the hardware required to join the said two body sections. There is nothing involved in the implementation that is not easily within existing materials and techniques employed in the field today. In fact, with the jointed fuselage feature an airplane can be easier to build with lower aerodynamic and support gear loads and lighter in weight than equivalent airplanes that presently exist.

Various fuselage joint configurations can be employed depending upon the particular design or mission of the airplane. One application would be a trunnion type of pivot for pitch with two side located journals. If yaw pivoting is needed the pivots 11 are held in blocks 71 that slide fore and aft in matching grooves or channels 78 in the front body to allow displacement in yaw. This arrangement, with a singletree assemblage described elsewhere would provide an open central area of the aft body for the drive shaft of an aft mounted propeller. Another application could be used if an aft mounted power source and aft propeller are not used. This would involve a central pivot about which pneumatic actuators could be placed at several outer locations to control the pitch and yaw displacements as required.

However, it should be noted that the design and cost of undercarriage wheels, springs, shocks, dampers, and related support gear is much simplified because of the shorter ground clearance required. Development of optimum configurations of the subject concept may show that retracting of landing gear during flight is not necessary and rather a simple extension of the spring-shock will provide adequate travel to ensure sufficient extension for absorption of the landing impact. This feature could be invaluable for huge airliners or air cargo planes of the future where heavy and complicated mechanisms could be all but eliminated with much of the weight supported by the aft body wheel or wheels. Also, instead of a horizontal programmed tail the aft body could be supported by a third lifting wing for large load carrying airplane applications. Note that both the horizontal tail feature and the third wing feature would require heavy aft body damping during up or down tail movements of the aft body and the "hold" mode or an aft body lock feature is needed to ensure proper operation and longitudinal trim. The third wing would require mounting similar to that described for a horizontal tail illustrated in FIG. 5.

One of the major benefits of the articulated fuselage concept is that the entire structure, including the propeller or other propulsion means, can be placed as close to the ground as desired. Previously, no airplane or combined airplane-auto vehicle has been so configured. For any airplane this is a desirable goal but for the roadable airplane it breaches the difference between success and failure considering the tradeoffs that must be made. The wing, engine, power train mechanisms, main support gear, and operator can all be placed at or just above the minimum road clearance allowed for motor car vehicles. Thus, except for control surface and propulsion aerodynamic loads, the fuselage structural weight is much lower than has been possible.

A conventional four wheel support can be used but much weight can be saved by using a tandem main wheel and single nose wheel coupled with lighter outrigger type support wheels that would carry only cornering or secondary loads. This would simplify steering and power application by using only one wheel for each function and no conventional power differential would be required. The reasoning behind the concept and the associated configuration is that the combined vehicle must be as light weight as possible. Otherwise, you wind up with an airplane-auto vehicle that will fly and will travel on the ground but it would not be useful or competitive because of inefficiencies and reduced performance as to speed and payload it can handle making it unacceptable.

The concept implementation as proposed above would make the automobile relatively light compared to a conventional automobile and thus there is concern for operator safety. However, with the relatively long aft body assembly and with the wings folded at an angle on each side of the seating area the vehicle has more crush protection than an automobile in those directions. Placement of light weight crushable material in the unused dead space in the nose of the vehicle would ensure head-on impact protection.

The aft body must have restraints placed upon it as to the ease and freedom by which it can operate. There must be built-in dampening and some preload to provide the proper operation of the aft body section. Air turbulence, and other sources of undesirable excitations to or between the two said bodies must be damped out and controlled by built-in dampers, and restrictors that sense the rapidity of angular displacement as well as the amplitude of displacement and provide the necessary restraint. This type of hardware is in use today and thus there is no anticipated problem in this area.

Since this is a new and radical departure from prior art there are some areas of the proposed vehicle that must be developed to optimize the concept for each application. It is anticipated, however, that any designer/builder of light airplanes can readily produce a combination vehicle using the concept which will perform adequately. With a little ingenuity, the experienced home-builder of aircraft will find this concept to be a challenge because there is nothing in the concept that would require anything but the tools and materials he or she already has at home in the garage.

OPERATION—FIGS. 1 AND 2

Starting with the vehicle at rest in a parked condition the operator starts the engine and selects power to the main wheel to taxi out or to enter a roadway. Steering is provided by the nose wheel with the tail wheel free to caster as a single wheel trailer behind an automobile functions.

Upon reaching a legal takeoff area with the engine adequately warmed to a stabilized temperature the operator deploys the wings to a fully extended position where automatic locks engage an interlock device that then allow the power selector to transfer power to the propeller and thence takeoff power is applied.

Takeoff roll and liftoff is handled in a conventional manner with care taken to not attempt an abrupt liftoff where a slight pitch trim change occurs when the aft body tail wheel breaks contact with the ground. This is not a significant trim change however, because the added weight of the aft body assembly is simultaneously offset by the upswing of the thrust vector. Also, aft body preload minimizes this trim change. The operator has the added assurance that even abrupt "hauling back" of the pitch control will not stall the aircraft as this is a characteristic advantage of the canard design. The operator has the option of building up speed while in ground effect as space permits to reduce strain on the engine and provide for a more efficient and safe climb out.

Note that the yaw pivot is not a part of the proposed embodiment but is included as an optional feature. If the yaw pivot is used directional control during takeoff, climb, cruise and landing can be performed by either locking out the aft body yaw control and using rudder only or by locking out rudder control and using aft body yaw displacement for control. A third option is that both aft body yaw and rudder can be used together which increases the effective rudder area which means that tail size could be further reduced. Also, this redundancy in directional control provides safety should one system fail. Similarly, the canard elevators and the up and down swing of the aft body in pitch provides a degree of pitch control redundancy.

In flight lateral roll control is provided by ailerons, however, these are hardly needed because the usual adverse roll is absent with the low placement of the vertical tail which automatically provides coordinated turning and banking. Thus, control about this airplane axis has a degree of redundancy.

Approach to the landing site can be made with the pitch control in full aft position and the rate of descent controlled by engine power. This is also a characteristic of the canard wing which is essential to making wide spread use of the combined vehicle to be fool proof as to wing stall.

Soft touchdown is aided by ground effect which helps to "forgive" too steep a rate of descent. At the end of the landing roll the operator transfers power to the main support wheel which then releases the wing interlock allowing the operator to fold the wings to the automatic secured position. This transfer of power cannot accidentally be performed while in flight because of a wheel switch or similar device that prevents the transfer unless full vehicle weight is on the main wheel. Thus the vehicle can proceed to its destination on the ground or can refuel and proceed on to its destination in flight.

The arrestor hook device provides an automatic arresting force to the conveyance in an emergency. No special technique is required. It will not penetrate or engage a normal landing surface but will penetrate and engage any unprepared surface that is significantly uneven or unhardened to the point that the tail wheel will depress sufficiently to lower the forward point of the hook into the surface. Thus, the operator can land in an emergency without concern as to any "emergency procedure" that he or she must perform.

UNIQUE FEATURES

Special features described in FIGS. 3, 4, 5, 6, and 7 and elsewhere above are peculiar to the radical design of this invention. Further clarification and discussion of these features, which enhance and expand the use of the jointed fuselage concept, follows:

1. The articulated fuselage concept or feature provide a number of special options in the design of the undercarriage also variously described herein as the ground support means or system, landing gear, or simply gear. These terms denote a system of wheels that may include or exclude the nose gear when discussing the automatic retraction feature. The radical design, in general, makes the support gear design to be simplified for two basic reasons. First, ground clearance is significantly shortened and extension or retraction of the gear can be as simple as just extending the shock struts 48 a few inches. Secondly, the energy of the aft body can be used to automatically retract the gear as explained elsewhere. This is especially valuable for large commercial aircraft where much cost, weight, complexity and safety is involved in this hardware. The impact is that this gear is no longer an item of concern to the degree that it has been in the past.

2. One of the main drawbacks to flying, whether a Piper Cub or a Boeing 747 is considered, is the emergency landing that eventually will occur even to a fleet of huge multi-engine commercial aircraft. This invention with the "inverted" tail provides a simple, low cost device that can greatly increase the safety and minimize the damage of this eventuality. The radical design allows initial ground contact to be with the aft body tail support with the bulk of the aircraft still in an upward slanting orientation. Thus, whether ditching in water or contacting the ground the device can be configured to "hook-in" or "plow-in" creating a planned aircraft arresting force that is somewhat constant and predictable.

Therefore, instead of the usual "bounce" followed by an abrupt "digging-in" the device prevents the bounce and controls the impact providing safety and less severe damage. The hook 99 device shown in FIG. 3 is a typical application for a small airplane. The strength of the tail support for the device is backed up with load transferring cabling or the equivalent routed to engine anchor points. The hook is solidly mounted at the bottom front corner of the tail. The hook is shaped to act as a regular tail skid on normal landing surfaces in case of tail wheel failure because the forward projecting point of the hook is elevated up from the surface by the curved bottom of the hook. However, unprepared or rough surfaces (including water) which will allow the tail wheel to depress into the surface will cause engagement. The upper surface of the forward projecting hook will cause a down force on the tail assembly due to its down sloping upper face upon penetration of the surface. Note: if you "arrest" the engine you arrest the transmission, drive shaft, propeller, etc. The load transfer means (not shown) is routed internally through the tail and aft body to two anchor points on each side of the engine. There is no limit as to how refined and developed this feature can be when employed on large commercial aircraft. The wing spar could be used as an anchor point for the system for such aircraft.

3. The pivoted aft body requires special displacement and motion restrictions and damping depending upon whether the 3-mode control of the aft body is used or only the "release" mode is required as for small airplane applications. FIG. 6 depicts a pneumatic system because it is light weight and flexible in use. However, for larger aircraft a hydraulic system may be required where heavier forces are to be experienced and weight is not as critical. Note that FIG. 6 is an illustration of how the control valve or valves can provide actuator control, damping, restraint, hold (with valve ports not aligned with actuator fitting ports) and the release mode. Special port seals are required to prevent gas leakage. This would be critical with heavier applications thus hydraulic fluid would be more practical. Note that in the release mode the medium (gas or liquid) must pass through the valve and the piston wafers (seals) of the actuator provide the necessary damping and constraint.

4. The all purpose universal pneumatic actuator system described above and elsewhere can employ the actuator described to perform various functions including wing fold and extension, "mini-gear" extension and retraction (minigear is a name coined to denote the application where only the extension or shortening of the actuator perform this operation,) separate extension or retraction of the nose gear (when main gear is automatically retracted by the aft body,) yaw displacement control and damping, aft body control, "hold" and damping, and any other related function. Note that the term "hold" is used and not "lock" because the actuator piston slides in the actuator cylinder and its position cam be overridden if the force is great enough as would be the case if the aft body were in the "hold" mode for landing. The wafer seals of the piston are calibrated for each application by adding or subtracting wafers to increase or decrease the amount of resistance it creates to oppose the external piston force.

The system can consist of any number of actuators, shocks, dampers, control valves, simple damper struts (such as used on current hatches of automobiles) and related remote control handles, etc. Thus the system is flexible and the control valves and pump or pumps can be located near the actuators with extensions located near the seated operator to control.

5. The "gang-gear" (a coined term denoting the gear shown in FIG. 4) depicted in FIG. 4 is an illustration only. Actual hardware would be much more short-coupled except that the outrigger wheels are mounted on a pivoted shaft that is as wide as the wing center section and has a calibrated flexibility that enables the three wheels of operate somewhat independently over uneven ground and yet all can be raised or lowered by one energy source. Note that the combined conveyance application is designed for limited ground speed and limited maneuvering and relatively smooth ground.

6. The purpose of the control system depicted in FIG. 5A is primarily to illustrate how a one-piece tail can be used to expand the radical concept to existing design where the horizontal tail is at the rear end of the fuselage. However, the operation of this tail can be expanded to include a third lifting wing for airplanes of the forward canard wing design. Thus, the tail depicted in the illustration can be considered to be a third lifting wing with all the other components remaining the same and with the airfoil illustrated simply enlarged to the size of a wing. The operation of such a third wing would require heavy damping and displacement constraint during the transition phases of aft body movement from aft body up to aft body down motion and an aft body "hold" mode is required once a static position is reached. The wing could then be used as an elevator in conjunction with the canard elevator which provides a new realm of longitudinal control and trim. Landings and takeoffs can be made in a constant level fuselage orientation with such an arrangement. This, of course would be restricted to highly developed, sophisticated applications of the jointed fuselage concept.

The two-piece tail depicted in FIGS. 5B and 5C illustrate a more conventional approach to placing a tail at the aft end of the fuselage. This tail is comprised of the conventional stabilizer and trailing elevator. Restrictions on the aft body stated above for a one-piece tail also apply to the two-piece tail. The illustrations show how the three basic requirements of such a tail are satisfied. First, starting with the aft body in the up position in level flight (to illustrate only- it would normally be down) as the aft body lowers the stabilizer (considered separately) remains at a constant angle relative to the front body providing dimension A equals dimension B (it is a parallelogram having opposite sides parallel and equal.)

Note however, as the tail lowers the angle of the air flow past the tail requires that the angle of the tail change to match the air flow. This second requirement is met by mounting the forward end of rigid tail link 54 to movable pivot 83. Thus dimension A can be shortened by the operator (it would normally already be at the proper position) by turning the threaded shaft that movable pivot 83 is mounted upon. Then when the aft body lowers the tail pitch angle increases to match the changing air flow angle created by down wash off the main wing. The third requirement of such a tail is that the elevator has to match the angle of the stabilizer (called "tail" above) as far as the up or down displacement of the aft body is concerned but also superimposed upon this programmed angle change the elevator must also be free to move up or down independent of aft body location. This is provided by the elevator pivot 82 that is mounted upon the movable pivot 83 with forward end of the elevator rigid link 56 being located at the same pivot 55 location as for the stabilizer link 54. In summary, the two-piece tail can be unaffected by aft body displacement, it can be programmed to change angle (±) commensurate with aft body displacement, the seated operator can change the amount of this commensurate angular change at any time and the operator can move the elevator at any time independent of the stabilizer angle or the aft body position.

7. The yaw pivot is not essential to the proposed embodiment and would complicate flight operations and ground handling. However, large commercial aircraft with sophisticated control systems could benefit by incorporating the yaw pivot with an "inverted" tail. The entire aft body and tail could act as a rudder or one of two other options could be used. First, the yaw displacement and the rudder displacement could be combined in the same direction or the rudder could be controlled as a servo with the aft body assembly free to be driven left or right by the trailing leverage force of the rudder as a second option. In any case, the yaw pivot option would result in more effective rudder area thus the area of the tail could be reduced. This is a critical concern for large swept wing aircraft. The means by which the yaw pivot can be employed and yet maintain a clear central area of the fuselage is depicted in FIG. 7. Note that the singletree hardware can be redundant and positioned at the top and bottom (or top or bottom) of the fuselage to provide this unobstructed central area.

8. The "passive-panel" (a coined term) described elsewhere provides a means of extending the canard wing to significantly increase the span of the canard without complicating the operation of the conveyance. Also, by increasing the span beyond the elevator the elevator becomes more effective without a change of elevator span because of the aerodynamic air flow involved. The required damping, passive operation and operator override control has been described elsewhere.

9. The aft body movement can be used to operate the retraction and extension of the ground support gear and can provide the variable cooling requirement for the conveyance power source as described elsewhere. This is a fail safe redundant system as proposed in the combination conveyance with the engine mounted just forward of the pitch joint and with two sets of struts attached to two aft body forward extension pivots 47.

This gear arrangement may appear to be too radical a departure from conventional design but actually the system is simple and foolproof. By using shock struts with the actuator control feature depicted in FIG. 6 the operator can adjust the gear length of extension to match various landing and surface conditions. For example, an emergency landing could be made on a sod field with the actuator struts shortened so that when the aft body swings up on landing the wheels extend only half-way out of the fuselage to prevent "digging-in" of the gear and yet the wheels would aid in a safer landing.

10. The radical design of the proposed embodiment, whether considered as only an airplane or as a combination conveyance, results in significant aerodynamic control and airplane efficiency improvements. These benefits are the result of the elimination of the reflexed camber (using the terms loosely) of the fuselage and the "inverted" tail. Note that the proper orientation of the tail is "down" while in flight but ground operations require that the tail be "up," thus traditionally the tail is considered inverted if it is down but this is actually a misnomer. The main argument for the radical design is that airplane design should be configured for the flight efficiency and proper control response requirements and not for a few seconds of operations during the "rotation" phase.

11. The suggested embodiment is configured to provide the maximum amount of wing area in the fixed non-folding center wing section. Also, the fuselage is as narrow as tandem seating of the operator (pilot/driver) and passenger allows to gain as much wing area as is possible (note that wing effectiveness is primarily a function of span and fuselage width is not as critical.) The proposed embodiment with its special hardware requirements, including the folding lift panel requirement, make total wing area a critical concern. To alleviate this stringent need a special feature is provided that mitigates the wing area problem.

Note that wing area is a compromise between large wing performance for takeoff, climb, high altitude, maneuverability, and landing phases of operation compared to high speed and related flight where a smaller wing is a better performer. Thus the proposed conveyance leans toward a smaller wing but makes up for any deficiency this creates by providing the up to 100 percent ground effect capability described elsewhere. This coupled with the upward slanting thrust line of the variable thrust vector during climb provide means to reduce takeoff and landing speeds and improve climb performance. High altitude flight is not a requirement of the vehicle. Thus, the best of all realms of flight and ground operations is provided.

12. The variable thrust vector of the propulsion thrust means (a propeller or jet thrust type) is a natural bonus feature of the jointed fuselage. Note that the thrust vector is aligned with the fuselage pivot for obvious reasons.

SUMMARY, RAMIFICATIONS AND SCOPE

The invention in its simplest form requires only an aft body pitch pivot and the means to control aft body displacement. Add to this a downward projecting tail and you gain additional aerodynamic benefits. Then, add a tail support wheel and you have the basic parts of the invention for an airplane. Add to this the wing and power conversion and related hardware means and you have the basic complete invention for a combination conveyance capable of air and land travel. Note that the above sequence of adding features provides increasing benefits and functions as follows:

1. starting with body pivot and aft body control you have ground clearance combined with aft body streamlining for increased flight efficiency;
2. add an inverted tail and you gain roll coupling, increased control response and additional flight efficiency due to overall body camber;
3. add a tail support wheel and you gain a passive system that needs no attention of the operator;
4. add flight and ground travel conversion means and you gain aircraft land travel utility.

The radical concept makes possible a myriad of ramifications, special considerations and optional features, some of which are included herein, as follows:

1. safer emergency landings are possible with the radical design. An arrestor hook can be added in front of the tail support wheel. This would provide controlled deceleration on unprepared surfaces by "hooking-in" instead of bouncing and abrupt digging-in of the airplane during a dead-stick landing;
2. the radical design allows ground clearance to be reduced down to or adjacent to zero distance. Thus landing gear hardware can be as simple as reducing or increasing pressure on the shock absorber piston to retract or extend the landing gear. This is not feasible where greater clearance is required in conventional design. However, aft body displacement makes this function completely automatic and passive as explained herein. Note that zero ground clearance only exists when the airplane is landing or taking off with a nose high attitude. With the nose wheel on the ground the portion of the wing behind the main gear rotates upward providing normal ground clearance;
3. implementation of the concept is simple with a canard wing. The use of the jointed body concept is expanded by incorporating a rear mounted tail with automatic programming presented herein. Also, the concept's use could be increased by mounting a third wing in place of a conventional tail as depicted in FIG. 5;
4. advantage can be taken of the up and down displacement of the aft body by allowing this energy to be used to retract the gear and alter engine cooling as explained that can be completely passive, i.e. no operator attention is required, and no additional components are required;
5. the passive panel feature of the canard is independent of the basic concept but is included as a part of the critical requirements to make a combination conveyance feasible and practical;
6. the aft body displacement could be controlled by hydraulic actuators, electric motors, mechanical cables or push-pull rods, or possible other means including the use of a computer. However, the pneumatic actuator system is considered most appropriate because of its relative light weight and flexibility;
7. an overall increase in flight efficiency of an airplane using the jointed body feature is claimed because the aft body can be aligned with the prevailing airflow. By the addition of an inverted tail the overall effective camber of body/tail combination is increased instead of being effectively reflexed as it is in conventional design, which further increases overall airflow efficiency;
8. the inverted tail reduces required tail area. With the yaw joint the tail area can be further reduced if the entire aft body assembly together with the vertical tail is used as a rudder. This is not needed for smaller aircraft but can be implemented on larger aircraft, especially those with swept wings. Note that the rudder can be used to amplify aft body deflection or it may be feasible to use the rudder as a servo to cause the displacement of the side to side swing of the tail assembly;

9. by overriding the passive positioning of the aft body the operator can optimize thrust angle vectoring for all flight conditions including the leveling of the front body for better climb visibility. Note also that subtle adjustment between aft body angles may be required to gain peak efficiency for such closely related conditions as high speed cruise, economy cruise and endurance cruise;

10. the additional weight and increased complexity of the body joint is more than offset by weight savings and elimination of conventional hardware and components;

11. a conventional arrangement of four wheels at the four corners of the front body and wing center section can be used. The tandem nose and rear power wheel arrangement with outrigger wheels is used on the proposed embodiment to save weight and cost of implementation considering that limited ground speed is specified for the combination conveyance;

12. the nose gear can be gang-linked to the main gear automatic retraction feature but independent manual operation of the nose gear has its advantages considering its location next to the pilot;

13. current road travel restrictions may prevent use of public dedicated roads for some time by the suggested combination vehicle. The philosophy of the proposed conveyance is that its advantages, even without public road use, are presently worthwhile and once such a conveyance is available public acceptance and vehicle codes will change to accommodate the concept just as horseless carriages evolved;

14. pneumatic actuator shock struts, as shown in FIG. 6, can control, absorb shocks, dampen motion, provide passive freedom and "hold" connected components. All these required functions including the extension and retraction of flight surfaces employ this universal component on the proposed embodiment;

15. freedom of the aft body in pitch only is all that is needed for the proposed conveyance. The use of a yaw pivot would complicate flight operations and any advantage would not be worth the added complexity. However, for large commercial aircraft it would have an advantage and thus a means of implementing the feature is included herein (FIG. 7) note that parking is easier without the yaw joint;

16. the automatic gear retraction/extension feature makes it impossible to land with the gear up. Negative pilot response to the feature is quickly changed to a positive one when it is realized that flight can be safer and simpler than in the past where this is a major item of concern;

17. the proposed solution to the problems of combining air and land travel in one vehicle is applied to an airplane instead of a vertical riser, helicopter, or other type of aircraft. The reason for this is that the airplane is considered to be the safest, most efficient, and most practical type of craft for such a mission.

The scope of the invention and its potential effect in the aviation field and on our national energy resources is incalculable. The primary advantages of the radical design change are in the areas of commercial aircraft flight efficiency and in general aviation utility and private airplane use.

Also, with the arrestor hook feature, airplane safety is significantly increased by eliminating much of the hazard of a forced landing. This eventuality has plagued both commercial and private airplane industries since the first airplane flew. The radical design provides a configuration that allows this feature to be practical. Note that no significant hardware has been developed to alleviate this problem to date.

The above discussion should not be construed as limiting the scope of the concept but merely provides examples and illustrations of a preferred embodiment of this invention. As stated elsewhere herein, this concept can be applied to any type of airplane even jumbo jet passenger airliners and air cargo planes. The concept was conceived in an attempt to solve the inherent problems of the subject combination vehicle but the numerous advantages of the jointed fuselage apply to all airplanes whether they are designed for road travel or not.

Therefore, the scope of the invention should be determined by the appended claims and their legal equivalents rather than by the examples given.

I claim:

1. An airplane with a two section body with an aft body connected to a front body by means that allow the two bodies to displace in pitch angular rotation relative to one another through an arc that provides for aft body ground clearance at all times and provides for aft body alignment with the air flow during flight with means that provide angular displacement control, passive holding of angular displacement, passive release of angular displacement control of the aft body and passive built-in restraint of unwanted angular movement of the aft body for all operational conditions and with a tail located at the aft end of said aft body that projects downward with a ground support means located at the bottom of said tail that is capable of ground travel in any direction with said tail projecting below the airplane while in flight to provide means for positive yaw/roll coupling forces for coordinated turning and banking without aileron control assistance.

2. The airplane of claim 1 with means of connecting a retractable landing gear to said aft body to provide automatic retraction of the gear when said aft body swings down upon takeoff and automatic extension of the gear when said aft body swings upward upon landing with no operator assistance required by using the energy and movement of the aft body to perform both of these operations.

3. The airplane of claim 1 with an air gap between the front body and the aft body configured to provide a large gap for engine air cooling while on the ground with said aft body displaced upward and with a reduced gap for restricted air flow during flight with said aft body displaced downward with no operator assistance required for either operation.

4. The airplane of claim 1 with an arrestor hook located at the bottom of said tail in front of said ground support means that is capable of automatically entering into unprepared, uneven, unhardened ground surfaces, including water, that will provide an arresting force to the airplane without operator assistance for emergency landings while being incapable of penetrating into leveled, hard surfaces such as roads, smoothened earthen landing strips and similar prepared and natural surfaces.

5. The airplane of claim 1 with a horizontal tail located at the aft end of said aft body with passive means to automatically provide programmed pitch angle of the tail to maintain airplane pitch control and pitch trim regardless of said aft body angular displacement without any operator assistance required except for occasional override adjustments for weight and balance and related changes with built-in means for aft body angular motion restraint and passive aft body displacement hold restraint.

6. The airplane of claim 1 with a propulsive thrust means located at the aft end of said aft body that is capable of thrust vector alignment relative to the front body and front body mounted flight surfaces, for all flight conditions, by allowing the aft body to assume an angular position in an aft body release mode and also by placing the aft body in any desired position in an override control mode of operation so that any desired alignment of the thrust vector can be established for any flight condition with provision to passively hold any angular position so selected with no further operator assistance required.

7. The airplane of claim 1 with an unusually light weight and simplistic landing and ground support gear system which is made possible by the low slung jointed fuselage combined with a propulsive thrust means located at the ground elevated aft end of the fuselage which, together, eliminate the basic need to retract or extend the landing gear to reduce drag.

8. The airplane of claim 1 with a canard lift wing located at the front of said front body and a rear main lift wing located at the rear of the front body that is flush with the bottom of the front body and extends partially beyond the rear of a main support wheel about which takeoff and landing rotations occur such that prior to landing rotation with a nose high attitude the trailing edge of the main wing can reach the ground surface providing up to 100 percent ground effect air cushion capability.

9. The airplane of claim 1 with a means that allows the two bodies to displace in yaw angular rotation relative to one another throughout an arc extending equally to the left and to the right of the front body center line with means to control the aft body angular displacement throughout said arc and with means of providing a centerless pivot for this freedom of yaw displacement.

10. The airplane of claim 1 with a canard lift wing located at the front of said front body and a rear main lift wing located at the rear of said front body and a third lift wing located at the aft end of said aft body with said third lift wing mounted by means that allow lift and longitudinal trim to be automatically and passively maintained regardless of aft body displacement with means for operator override control and with a means of constraint to prevent unwanted motion and displacement.

11. An airplane and a ground travel conveyance combined in one vehicle with a two section body with an aft body connected to a front body by means that allow the two bodies to displace in pitch angular rotation relative to one another through an arc that provides for aft body ground clearance at all times and provides for aft body alignment with the air flow during flight with means that provide angular displacement control, passive holding of angular displacement, passive release of angular displacement control of the aft body and passive built-in restraint of unwanted angular movement of the aft body for all operational conditions and with a tail located at the aft end of said aft body that projects downward with a ground support means located at the bottom of said tail that is capable of ground travel in any direction with said tail projecting below the airplane while in flight to provide means for positive yaw/roll coupling forces for coordinated turning and banking without aileron control assistance, and with a flight propulsive thrust means located at the aft end of the aft body, and with means of converting the flight surfaces to public road size limitations and with a means of transferring power from a power source to either said flight propulsive thrust means or to a ground traction propulsion means.

12. The combination vehicle of claim 11 with a canard lift wing located at the front of the front body and a rear main lift wing located at the rear of the front body with an elevator located at the rear of each side of a fixed center section of the canard wing that is capable of providing pitch control and pitch trim to the airplane during flight and ailerons located at the rear of main wing outer panels that are capable of being reflexed and trimmed to provide additional longitudinal control and longitudinal trim as required for flight and with the canard lift wing comprised of a fixed center section and outer panels that are free to fold downward automatically by their own weight and extend upward in flight automatically by aerodynamic force with built-in dampening and constraint of unwanted motion with the extension and folding operations requiring no operator assistance except for an override control means whereby the panels can be folded by the operator for ground travel and can be extended if required.

13. The combination vehicle of claim 11 with means of connecting a retractable landing gear system to said aft body to provide automatic retraction of the gear when said aft body swings down upon takeoff and automatic extension of the gear when the aft body swings upward upon landing with no operator manipulation required by using the energy and movement of the aft body to perform both of these operations.

14. The combination vehicle of claim 11 with an air gap between the two bodies contoured to provide a large gap adequate for engine air cooling while on the ground with said aft body displaced upward and with a reduced gap for restricted air flow during flight with the aft body displaced downward with no operator assistance required for either operation.

15. The combination vehicle of claim 11 with an arrestor hook located at the bottom of said tail in front of said ground support means that is capable of automatically entering into unprepared, uneven, unhardened ground surfaces, including water, providing an arresting force to the airplane without operator assistance while being incapable of penetrating into and engaging leveled, hard surfaces such as roads, smoothened earthen landing strips and similar prepared and natural surfaces.

16. The combination vehicle of claim 11 with a horizontal tail located at the aft end of said aft body with means to automatically program pitch angle of the tail to maintain airplane pitch control and pitch trim regardless of aft body angular displacement without any operator assistance required except for occasional override trim adjustments for weight and balance and related changes and with adequate aft body angular motion and hold restraint means.

17. The combination vehicle of claim 11 with a propulsive thrust means located at the aft end of said aft body that is capable of thrust vector alignment relative to the front body and front body mounted flight surfaces, for all flight conditions, by allowing the aft body to align with the air flow in the aft body release mode and by placing the aft body in any desired position in the control mode of operation so that any desired alignment of the thrust vector can be established for any flight condition with provision to passively hold any angular position so selected with no further operator assistance required.

18. The combination vehicle of claim 11 with an unusually light-weight and simplistic landing and ground support gear system made possible by the low slung jointed fuselage combined with a propulsive thrust means located at the elevated aft end of the fuselage which, together, eliminate the basic need to retract or extend the gear to reduce drag.

19. The combination vehicle of claim 11 with a canard lift wing located at the front of said front body and a rear main lift wing located at the rear of the front body that is flush with the bottom of the front body and partially extends behind the rear of a main support wheel about which takeoff and landing rotations occur such that prior to landing rotation with a nose high attitude the trailing edge of the main wing can reach the ground surface providing up to 100 percent ground effect air cushion capability.

20. The combination vehicle of claim 11 with a means that allows the two bodies to displace in yaw angular rotation relative to one another throughout an arc extending equally to the left and to the right of the front body centerline with means to control the aft body angular displacement throughout said arc and with means of providing a centerless pivot for this freedom of yaw displacement.

* * * * *